(12) United States Patent
Ito et al.

(10) Patent No.: US 6,600,309 B2
(45) Date of Patent: Jul. 29, 2003

(54) PULSE SIGNAL GENERATOR AND METHOD OF MAKING SAME

(75) Inventors: Tomoaki Ito, Tokyo (JP); Masami Tanaka, Tokyo (JP); Tadashi Kubota, Tokyo (JP); Yasuhiro Masuzaki, Tokyo (JP)

(73) Assignee: Hirose Electric Co., Ltd., Tokyo (JP)

( * ) Notice: Subject to any disclaimer, the term of this patent is extended or adjusted under 35 U.S.C. 154(b) by 0 days.

(21) Appl. No.: 10/012,485

(22) Filed: Dec. 12, 2001

(65) Prior Publication Data

US 2003/0107369 A1 Jun. 12, 2003

(51) Int. Cl.[7] ............................................. G01R 33/02
(52) U.S. Cl. ................... 324/207.13; 324/174
(58) Field of Search ....................... 324/207.13, 207.24, 324/207.25, 207.17, 173, 174; 29/595

(56) References Cited

U.S. PATENT DOCUMENTS 4,259,603 A * 3/1981 Uchiyama et al. ........ 310/68 B
5,032,790 A    7/1991 Johnson
5,575,176 A * 11/1996 Rohrs et al. ............. 74/479.01
5,821,744 A   10/1998 Shinjo et al.

FOREIGN PATENT DOCUMENTS

| EP | 0655609 | 5/1995 |
| EP | 0987821 | 3/2000 |
| GB | 2107882 | 5/1983 |

* cited by examiner

*Primary Examiner*—N. Le
*Assistant Examiner*—Reena Aurora
(74) *Attorney, Agent, or Firm*—Kanesaka & Takeuchi

(57) ABSTRACT

A pulse signal generator comprises a detection assembly including a magnetic field generator and a magnetic element wire able to cause a large Barkhausen jump such that it produces a pulse signal responsive to the movement of the object to be detected; a case for housing the detection assembly; an attaching member; and a positioning guide provided on the inside surface of the case to position the detection assembly at the desired position with respect to the object to be detected.

3 Claims, 5 Drawing Sheets

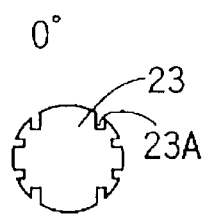
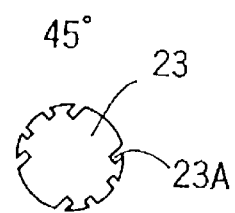
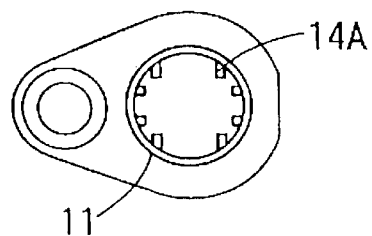
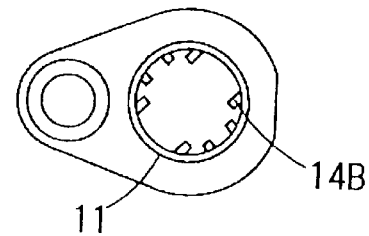
FIG. 6
FIG. 7
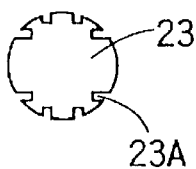
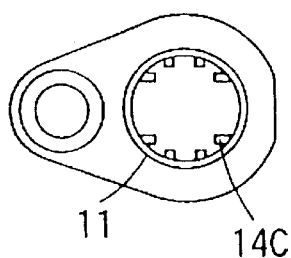
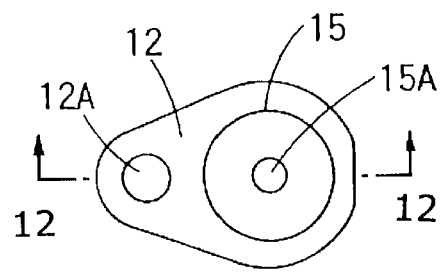
FIG. 8
FIG. 9

PULSE SIGNAL GENERATOR AND METHOD OF MAKING SAME

BACKGROUND OF THE INVENTION

1. Field of the Invention

The present invention relates to a pulse signal generator and a method of making the same.

2. Description of the Related Art

It is necessary in some automatic control or electric and electronic equipment to generate a pulse signal corresponding to the position or speed of a moving object or responsive to various operations. An example of the conventional pulse signal generator is a revolution detector by means of an electromagnetic/optical pick-up or Hall/magnetic reluctance element. The electromagnetic type, however, provides low output power in the range between 0 and low-speed revolutions. The optical pick-up system requires a broadband d-c amplifier and a dust proof structure. The Hall/reluctance system needs a plurality of elements and an amplifier. In addition, the optical pick-up, up, Hall, and reluctance systems employ an element that is too sensitive to temperature to use in the environment that experiences large temperature changes.

Consequently, these revolution detectors are not able to detect the revolution speed or position of an engine crank or cam shaft for very low- to high-speed revolutions. In addition, they are not suitable for use in an automobile that experiences wide temperature changes and noise.

Japanese patent application Kokai Nos. 2000-101400 and 101401 disclose a pulse signal generator employing a magnetic element wire that is able to cause the large Barkhausen jump. The pulse signal generator of this type is free from the above problems, but it still needs improvements for use in automobiles. For example, it must be versatile in terms of installation in the limited space of an automobile. Such a limited space varies with the positions of engine and other associated parts of each car model. In order to provide accurate detection, it is necessary to install the pulse signal generator at the right position relative to the object to be detected. Thus, the versatility of the generator in terms of installation is essential.

SUMMARY OF THE INVENTION

Accordingly, it is an object of the invention to provide a pulse signal generator that is versatile for installation and a method of making such a generator.

According to an aspect of the invention there is provided a pulse signal generator which comprises a detection assembly including a magnetic field generating unit and a magnetic element wire able to cause a large Barkhausen jump responsive to movement of an object to be detected; a case for housing said detection assembly; an attaching section for attaching said case; and a positioning guide provided on an inside surface of said case for positioning said detection assembly at a desired angular position with respect to said object.

According to an embodiment of the invention, the attaching section is molded integrally with said case as a unit and said positioning guide is molded integrally with said case at a predetermined angular position with respect to said attaching section.

According to another embodiment of the invention, the case is rotatable with respect to said attaching section and said detection assembly is locked at a desired angular position with respect to said attaching section.

According to another aspect of the invention there is provided a method of making the pulse signal, comprising the steps of providing an upper half mold having an upper half mold cavity for defining an upper half of an outer surface of said case and a lower half mold having a lower half mold cavity for defining a lower half of said outer surface, and a rotatable mold for defining an inside surface of said case; closing said upper and lower half molds such that said rotatable mold is rotated to a desired angular position to form an annular mold cavity between said upper and lower half molds and said rotatable mold; pouring a mold material into said annular mold cavity to form said case; and installing said detection assembly in said case.

BRIEF DESCRIPTION OF THE DRAWINGS

FIGS. 6–8 are diagrams each showing the mold at an angular position of 0, 45, or 90 degrees;

FIG. 9 is a plan view of a case for a pulse signal generator according to another embodiment of the invention;

DESCRIPTION OF THE PREFERRED EMBODIMENT

Embodiments of the invention will now be described with reference to the accompanying drawings.

Figure 1:
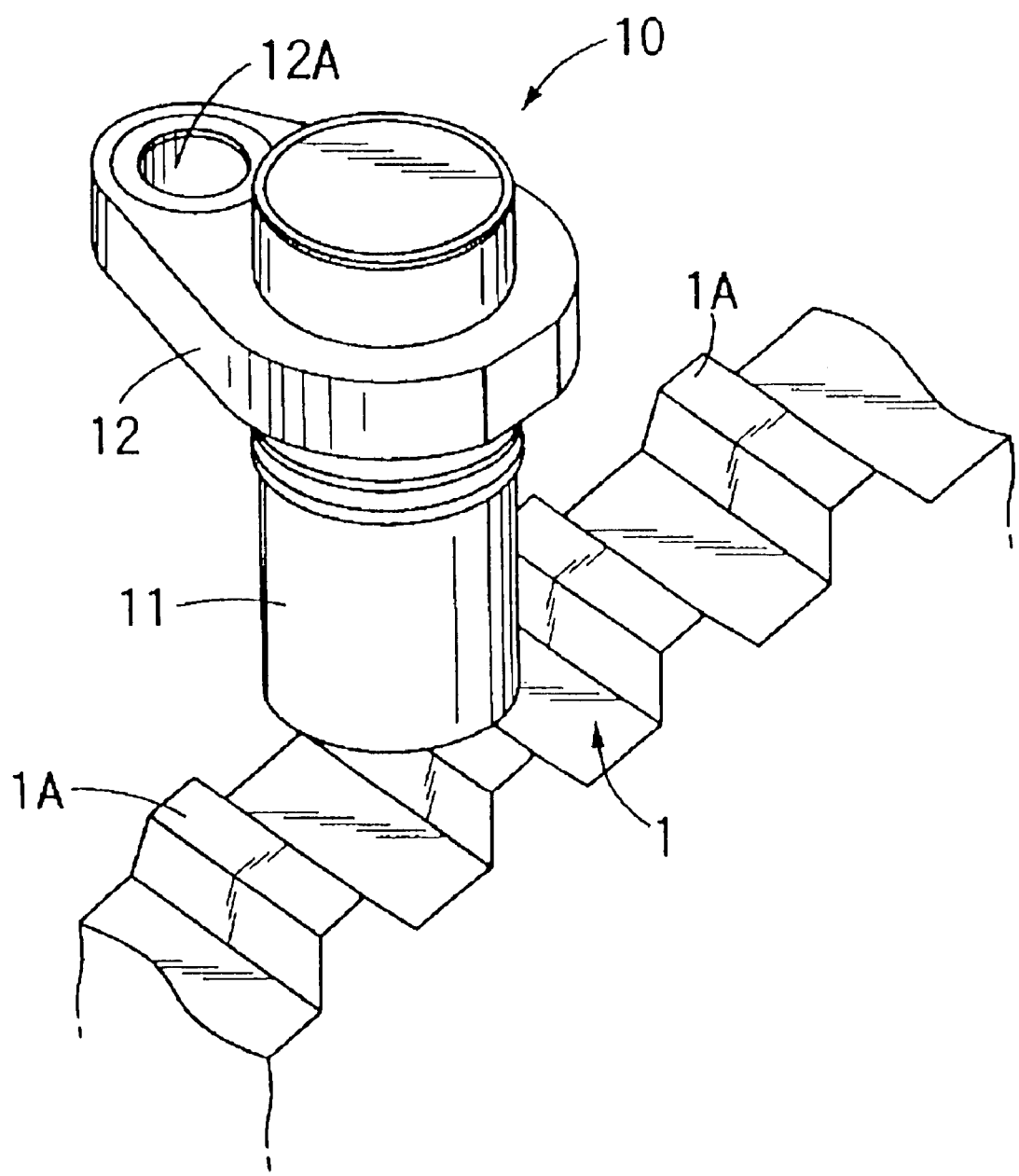
FIG. 1 is a perspective view of a pulse signal generator according to an embodiment of the invention.
Figure 2:
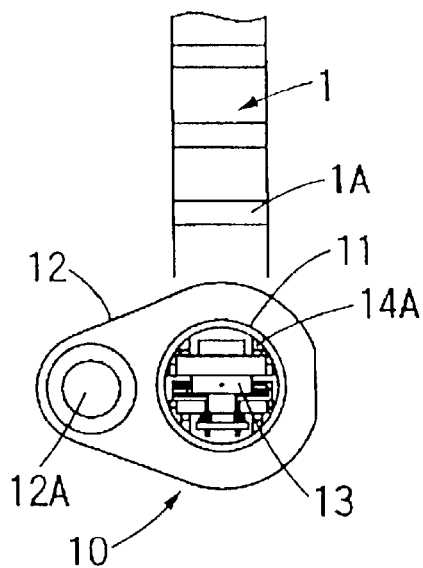
FIG. 2 is a plan view of the pulse signal generator positioned at 0 degree with respect to the normal direction.
Figure 3:
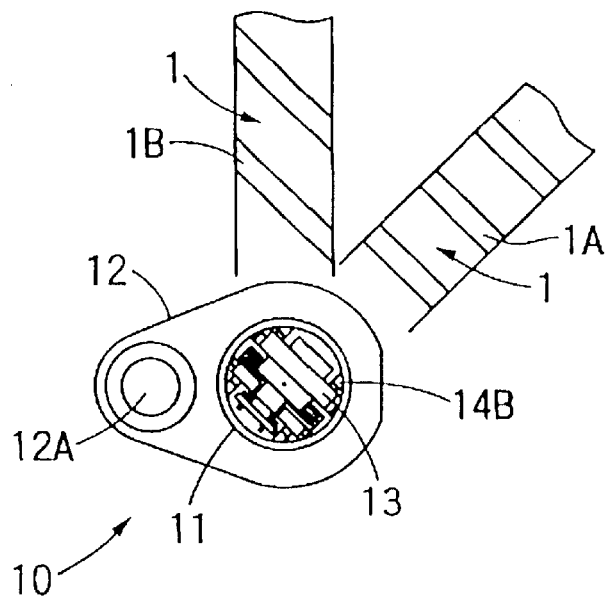
FIG. 3 is a plan view of the pulse signal generator positioned at 45 degrees with respect to the normal direction.
Figure 4:
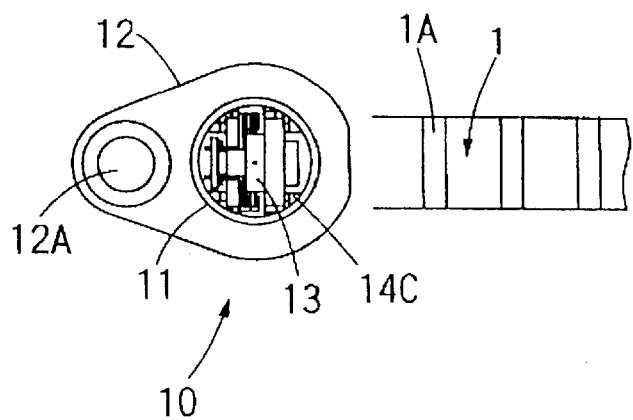
FIG. 4 is a plan view of the pulse signal generator positioned at 90 degrees with respect to the normal direction.

In FIG. 1, a pulse signal generator 10 comprises a cylindrical case 11, an attaching member 12 integrated with the case 11 as a unit, and a detection assembly 13 (FIGS. 2–4). An attaching hole 12A is provided in the attaching member 12 for receiving a fixing screw or bolt. The pulse signal generator 10 is attached to an appropriate support with the attaching member 12 such that the detection assembly 13 is provided at the right position to detect the object 1 that moves in step with the revolution of an automobile engine, for example. As the object 1 moves, the teeth 1A pass through the vicinity of the detection assembly 13.

The detection assembly 13 is the same as those of JP'400 and JP'401 in principle and comprises a coil winding provided around a bobbin which houses a magnetic element wire that is able to cause the large Barkhausen jump, a pair of magnet/yoke combinations provided on either side of the bobbin, and an adjusting yoke provided beside one of the magnet/yoke combinations. It may includes a printed circuit board on which a waveform shaping circuit is mounted to shape the waveform of electric pulses generated by the coil winding.

In operation, every time a tooth 1A of the object 1 passes through the vicinity of the detection assembly 13, the magnetic field applied to the magnetic element wire changes, which in turn causes the magnetic element wire to produce a large Barkhausen jump, thus generating an electric pulse across the coil winding. The waveform of the pulse is shaped by the waveform shaping circuit and outputted from the pulse signal generator.

For the pulse signal generator, it is important to provide the detection assembly 13 at the right position relative to the object to be detected. More specifically, it is important that the tooth passes through the vicinity of the detection assembly 13 in the order of one of the magnet, the magnetic element wire, and the other magnet of the detection assembly 13. In order to facilitate such positioning, according to the invention, a positioning guide 14 is provided on the inside surface of the case 11. The positioning guide 14 is made such that it has an interior shape that matches the exterior shape of the detection assembly.

The positioning guide 14 will be described with reference to FIGS. 2 and 3. In FIG. 2, the object 1 with teeth 1A moves in the normal direction that is perpendicular to the longitudinal axis of the pulse signal generator 10. This positioning of the detection assembly 13 is called "normal or 0-degree positioning". Under the 0-degree positioning, a positioning guide 14A is provided in the case 11 so as to position the magnets of the detection assembly 13 in parallel with the teeth 1A.

In FIG. 3, the object 1 with teeth 1A moves at 45 degrees from the normal direction of the pulse signal generator 10. The object 1 with teeth 1B tilted by 45 degrees from the normal direction moves in the normal direction. This is called "45-degree positioning". Under the 45-degree positioning, a positioning guide 14B is provided within the case 11 so as to position the magnets of the detection assembly 13 in parallel with the teeth 1A and 1B to be detected.

In FIG. 4, the object 1 with teeth 1A moves in the direction 90 degrees from the normal direction of the pulse signal generator 10. This is called "90-degree positioning". Under the 90-degree positioning, a positioning guide 14C is provided within the case 11 so as to position the magnets of the detection assembly 13 in parallel with the teeth 1A.

A comparison among FIGS. 2–4 shows the positioning guides 14B and 14C are provided at 45 and 90 degrees displaced from the normal direction of the case 11, respectively. Alternatively, the detection assembly may be modified such that it is combined with a common positioning guide to provide 0-, 45-, or 90-degree positioning.

How to make such a positioning guide will be described with reference to FIGS. 5–8.

Figure 5:
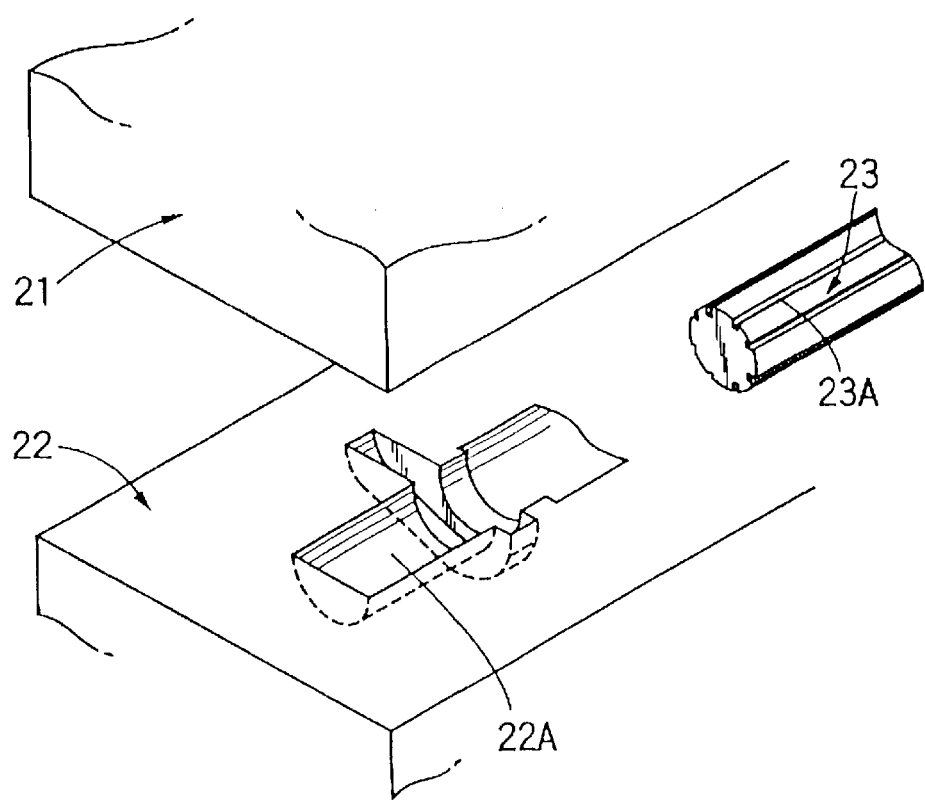
FIG. 5 is a perspective view of a molding apparatus for molding a case with a plastic.
Figure 10:
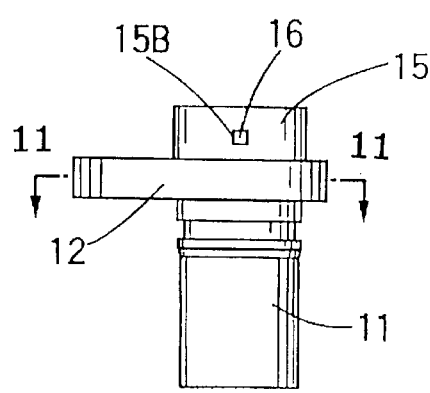
FIG. 10 is a side view of the pulse signal generator of FIG. 9.

In FIG. 5, a molding apparatus for molding the case with a plastic comprises upper and lower metal molds 21 and 22 and a rotatable metal mold 23. A molding cavity 22A is provided in the lower metal mold 22 to mold a half of the case. Similarly, the upper metal mold 21 has a molding cavity for molding the other half of the case. The rotatable metal mold 23 is provided with a plurality of molding contours 23A, such as grooves, recesses, or ridges, for determining the interior contour of the case.

The rotatable metal mold 23 is placed in a molding cavity defined by the upper and lower half molds 21 and 22 such that its central axis is aligned with the central axis of the molding cavity. It is rotatable about the central axis and fixable at a given angle.

In FIG. 6, the rotatable metal mold 23 is rotated and fixed at such an angle that its molding contour 23A is placed in the 0-degree positioning. Then, the upper and lower metal molds 21 and 22 are closed to form an annular molding cavity between the half molds 21 and 22 and the rotatable mold 23, into which a mold material is poured to form the case 11 that has the positioning guide 14A at 0 degree.

In FIG. 7, the rotatable metal mold 23 is rotated and fixed at such an angle that its molding contour 23A is brought to the 45-degree positioning. The upper and lower metal molds 21 and 22 are closed to form a molding cavity, into which a mold material is poured to provide the case 11 having the positioning guide 14B at 45 degree from the positioning guide 14A or the normal direction.

In FIG. 8, the rotatable metal mold 23 is rotated and fixed at such an angle that its molding contour 23A is brought to the 90-degree positioning. The upper and lower metal molds 21 and 22 are closed to form a molding cavity, into which a mold material is poured to form the case 11 having the positioning guide 14C at 90 degrees from the positioning guide 14A or the normal direction.

Alternatively, by fixing the rotatable metal mold at a given angle, it is possible to provide a case for the pulse signal generator that is useful for a given angle.

The case of the detection assembly may be made such that it is attached to a fixture at a given angle to achieve the same object. An example of such a case will be described with reference to FIGS. 9–12. The same components of a pulse generator as those of the above embodiment will be given like reference characters.

Figure 11:
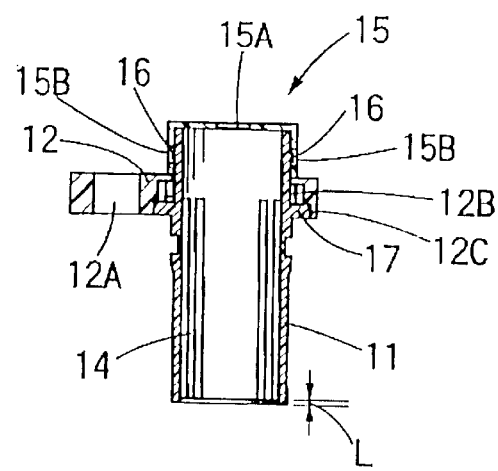
FIG. 11 is a sectional view taken along line 11—11 of FIG. 9.
Figure 12:
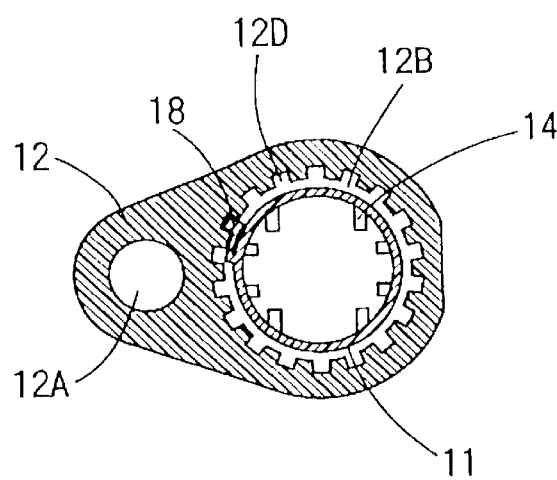
FIG. 12 is a sectional view taken along line 12—12 of FIG. 9.

In FIGS. 11 and 12, a separate attaching member 12 is fixed to a case 11 such that the case 11 is rotatable within the attaching member 12. A cap 15 closes the end of the case 11 opposite to the detection section. A positioning guide 14 is formed on the inside surface of the case 11.

A through-hole 12B is provided in the attaching member 12 to hold the case 11 for rotation. On the circumferential surface of the through-hole 12B there are provided a circular groove 12C for centering with the case 11 and a plurality of positioning notches 12D for determining the angle of the case 11. As best shown in FIG. 12, 20 positioning notches 12D are arranged at angular intervals of 18 degrees. On the outside surface of the case 11 there are provided a fixed lock 16 which fits in an opening 15B of the cap 15 for locking the cap 15, a positioning flange 17 which fits in the circular groove 12C for determining the rotation center of the case 11, and a movable lock 18 for engagement with one of the positioning notches 12D.

Such pulse signal generator is assembled in the following order. First of all, the detection assembly similar to the detection assembly 13 is put in the case 11 such that it is aligned with the positioning guide 14, and a resin is filled in the case 11 to fix the detection assembly in the case 11. As shown in FIG. 11, the distance between the end of the detection assembly and the front end of the case 11, L, is set at 0.3 to 0.5 mm so that the case is located as far as possible from the object to be detected but the detection assembly is located as near as possible to the object.

The case 11 is assembled with the attaching member 12 such that the positioning flange 17 fits in the circular groove 12C, and the cap 15 is put on the end of the case 11 that projects from the through-hole 12B of the attaching member 12. Simultaneously, a cable is pulled out through a cable outlet 15A of the cap 15 from the power source and pulse signal output. The fixed lock 16 is snapped into the opening 15B of the cap 15 to lock the cap 15 to the case 11. Thus, the case 11 is fitted in the attaching member 12.

By rotating the case 11 within the through-hole 12B of the attaching member 12 such that the movable lock 18 reaches the lock notch 12D at the desired angular position, it is possible to use the pulse signal generator at the desired angular position with respect to the object. In order to change the angular position, a certain degree of rotary force is applied to the case 11 to release the movable lock 18 from the locking notch 12D and rotate the case 11 with respect to the attaching member 12 until the movable lock 18 reaches the locking notch 12D at the desired angular position.

As has been described above, according to the invention, it is possible to provide a pulse signal generator that is able to be placed at a right position with respect to the object to be detected in any environment.

What is claimed is:

1. A pulse signal generator comprising:
    a detection assembly including a magnetic field, generating unit having a pair of magnet/yoke combinations and a magnetic element provided between said magnet/yoke combinations and capable of causing a large Barkhausen jump responsive to movement of an object to be detected;
    a case for housing said detection assembly;
    an attaching member linked with said case for attaching said pulse signal generator to an appropriate support so that said detection assembly is positioned in the vicinity of said object; and
    a positioning guide provided on an inside surface of said case for placing said detection assembly at a desired angular position with respect to said object such that said object passes through the vicinity of one of magnet/yoke combinations, said magnetic element wire, and the other of magnet/yoke combinations in this order, said positioning guide having an interior shape which matches an exterior shape of said detection assembly.

2. The pulse signal generator according to claim 1, wherein said attaching section is molded integrally with said case as a unit and said positioning guide is molded integrally with said case at a predetermined angular position with respect to said attaching section.

3. The pulse signal generator according to claim 1, wherein said case is rotatable with respect to said attaching member and locked to said attaching member when said detection assembly is placed at a desired angular position with respect to said object.

* * * * *